Patented Dec. 5, 1950

2,532,291

UNITED STATES PATENT OFFICE 2,532,291

PHENYLMERCAPTOACRYLATES AND PHENYLMERCAPTOMALEATES

Willard J. Croxall, Bryn Athyn, and Louis R. Freimiller, Philadelphia, Pa., assignors to Rohm & Haas Company, Philadelphia, Pa., a corporation of Delaware No Drawing. Application October 2, 1948,
Serial No. 52,609

7 Claims. (Cl. 260—470)

This invention concerns phenylmercapto-acrylates and -maleates and deals with a method for their preparation.

We have found that when an ether ester of the formula

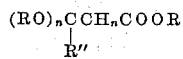

wherein R'' represents hydrogen or the —COOR group, R represents a saturated, non-tertiary aliphatic hydrocarbon group, particularly one of not over eight carbon atoms and preferably of not over four carbon atoms, and $n$ represents an integer from one to two, is heated at 90° C. to 250° C. in the presence of an alkali metal acid sulfate with a thiophenol, there result mercaptomaleates and acrylates of the formula

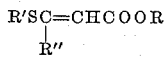

wherein R and R'' have the significance given above and R' represents an aromatic radical of the benzene series.

The ether esters may be ether propionates 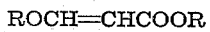, ether acrylates

ROCH=CHCOOR ether succinates $(RO)_2C(COOR)CH_2COOR$, or ether maleates $ROC(COOR)=CHCOOR$.

As catalyst for effecting the change to beta-mercaptoacrylate or mercaptomaleate, there may be used an alkali metal acid sulfate, such as sodium hydrogen sulfate or potassium hydrogen sulfate. The amount of such catalyst required is small, 0.01% to 1% of the weight of the reactants being usually sufficient.

When the mixture of thiophenol and ether ester has been heated until two moles of alcohol have been separated per mole of diether propionate or diether succinate or one mole of alcohol has been separated per mole of ether acrylate or ether maleate, the catalyst is removed or destroyed, as by filtering, washing, or neutralizing.

As a thiophenol, there may be used thiophenol itself, thiocresol, thioxylenol, ethylphenyl mercaptan, di(ethyl)thiophenol, di(propyl)thiophenol, tert.-butylphenyl mercaptan, amylphenyl mercaptan, diamylphenyl mercaptan, octylphenyl mercaptan, (diisobutyl)phenyl mercaptan, trimethylphenyl mercaptan, methylethylphenyl mercaptan, phenyl thiophenol, etc. Polycyclic mercaptans have also been found to undergo the reaction heredisclosed, such as alpha-naphthyl mercaptan and alkyl derivatives thereof. There may, furthermore, be used such thiols as p-nitrophenyl mercaptan, p-chlorophenyl mercaptan, and p-bromophenyl mercaptan or alkoxyphenyl mercaptans, such as methoxyphenyl or butoxyphenyl mercaptan, or acylphenyl mercaptans, such as acetylphenyl mercaptan. The thiophenol selected should boil higher than the alcohol ROH which it displaces from the ether ester.

The ether esters are available through the reaction of acetylene and an ester of carbonic acid, $(RO)_2CO$, in the presence of a strongly basic, anhydrous catalyst. This reaction is fully described in U. S. application Serial No. 52,607, filed on even date. As there shown, acetylene is run into a mixture of a carbonate ester and alkaline catalyst at 20° C. to 110° C. When the reaction has been completed, the catalyst may be destroyed, as by washing it away or by neutralizing it. The products are then worked up. The principal product is generally a diether propionate. Along with it, beta-ether acrylate is usually obtained. These two esters may be fractionated from each other if desired or a fraction may be distilled which contains both. Higher boiling fractions yield ether maleate and diether succinate or a mixture thereof.

Suitable catalysts in the above reaction are alkali metal acetylides, alkali metal alcoholates, and quaternary ammonium alcoholates. Typical examples of catalysts are sodium acetylide, potassium acetylide, sodium methylate, potassium ethylate, sodium butoxide, sodium octoxide, benzyl trimethyl ammonium methoxide, dibenzyl dimethyl ammonium ethoxide, benzyl trimethyl ammonium tert.-butoxide, etc.

The beta,beta-diether propionates are converted to beta-ether acrylates when they are heated with a dealcoholating catalyst, which may be either acidic or basic, and alcohol is separated. Likewise, the alpha,alpha-diether succinates are converted to ether maleates when the former are heated in the presence of dealcoholating catalysts and alcohol is separated. The dealcoholation reaction is fully described in U. S. application Serial No. 52,608, filed on even date. It is sometimes convenient to remove a mole of alcohol from a diether propionate or diether succinate before the conversion to a mercapto compound is attempted.

Typical propionates serving as starting materials are methyl beta,beta-dimethoxypropionate, ethyl beta,beta-diethoxypropionate, propyl beta,-beta-dipropoxypropionate, isopropyl beta,beta-diisopropoxypropionate, butyl beta,beta-dibutoxypropionate—all preferred propionates—or amyl beta,beta-diamyloxypropionates, hexyl beta,beta-dihexoxypropionate, 2-ethylbutyl beta,-beta-di(2-ethylbutoxy)propionate, 2-ethylhexyl beta,beta-di(2-ethylhexoxy)propionate, octyl beta,beta-dioctoxypropionate, and so on. Larger alkyl substituents may be used when the thiophenol reacted boils higher than the displaced alcohol.

The comparable acrylates may be used as starting materials or mixtures of diether propionates and ether acrylates. Typical useful acrylates are methyl beta-methoxyacrylate, ethyl beta-ethoxyacrylate, propyl beta-propoxyacrylate, butyl beta-butoxyacrylate, octyl beta-octoxyacrylate, and the like.

The diether succinates obtainable by the reaction between acetylene and carbonate may be represented with such compounds as dimethyl alpha,alpha-dimethoxysuccinate, diethyl alpha,-alpha-diethoxysuccinate, dipropyl alpha,alpha-dipropoxysuccinate, and dibutyl alpha,alpha-dibutoxysuccinate. Comparable maleates are dimethyl alpha-methoxymaleate, diethyl alpha-ethoxymaleate, dipropyl alpha-propoxymaleate, and dibutyl alpha-butoxymaleate. In the case of the diesters it is best to deal with these esters formed from saturated monohydric alcohols of one to four carbon atoms.

The preparation of beta-beta-diether propionates and succinates together with corresponding beta-ether acrylates and ether maleates is illustrated by the following example. An apparatus, comprising a flask equipped with gas-tight, stainless steel stirrer with blades scraping the bottom of the flask, was charged with 225 grams of anhydrous ethyl alcohol and 30 grams of sodium metal cut in cubes. After the sodium had dissolved, excess alcohol was evaporated under reduced pressure. The sodium ethylate remained as a dry powder. Thereto was added 2200 grams of anhydrous diethyl carbonate.

The flask was then equipped with gas inlet and outlet tubes, a manometer, and thermometer. The flask was flushed with nitrogen and heated to about 80° C. Acetylene was passed in, being taken from a commercial cylinder, scrubbed with water and sulfuric acid, and passed over soda lime. When the rate of obsorption af acetylene became very slow, the flask was cooled and the flow of acetylene was discontinued. Dilute acetic acid was added to destroy the alkaline catalyst. Two layers formed in the flask. The upper, oily layer was retained and fractionally distilled.

A forerun was obtained at normal pressure. It consisted of ethyl alcohol and ethyl carbonate. Distillation was continued under reduced pressure. A fraction taken off at 65°–75° C./2–4 mm. consisted of about 10% of ethyl beta-ethoxyacrylate and 90% of ethyl beta,beta-diethoxypropionate. There was then obtained at 75° C./4 mm. a fraction of pure ethyl beta,beta-diethoxypropionate. Between 75° C./4 mm. and 114° C./3 mm. there was obtained a fraction which was a mixture of ethyl beta,beta-diethoxypropionate and diethyl alpha,alpha-diethoxysuccinate. At 114°–115° C./3–4 mm. there was obtained a fraction of diethyl alpha,alpha-diethoxysuccinate. On further distillation a fraction containing this succinate with some diethyl alpha-ethoxymaleate was obtained.

The preparation of beta-mercaptoacrylates and alpha-mercaptomaleates is illustrated by the following examples.

Example 1

In a reaction vessel equipped with a short, packed column and distilling head there were placed 110 grams of thiophenol, 144 grams of ethyl beta-ethoxyacrylate, and one gram of sodium hydrogen sulfate. The mixture was heated rapidly. At a pot temperature of about 168° C. ethanol began to distill. The pot temperature fell to 140° C., but then it slowly increased as the ethyl alcohol displaced in the reaction was taken off. After 91% of the theoretical amount of alcohol had been distilled, the reaction mixture was heated under reduced pressure and fractionated. The fraction obtained at 145°–150° C./2–3 mm. amounted to 180 grams. It was identified as ethyl beta-phenylthioacrylate, a pale yellow, viscous liquid.

Example 2

The procedure of Example 1 was followed with a mixture of 110 grams of thiophenol, 190 grams of ethyl beta,beta-diethoxypropionate, and one gram of sodium hydrogen sulfate. The fraction collected at 145° C./2 mm., was identified as ethyl beta-phenylthioacrylate, identical with the product obtained in Example 1.

A portion of ethyl beta-phenylthioarcylate was saponified with a potassium hydroxide solution by stirring and heating the mixture on a water bath. The reaction mixture was cooled and acidified with dilute hydrochloric acid. A solid separated. This was crystallized from petroleum ether and recrystallized from acetone. The solid as first obtained is a mixture of cis and trans forms of beta-phenylthioacrylic acid. The mixture crystallized from petroleum ether melted from 75° to 103° C. The product, recrystallized from acetone, melted at 122° C. The neutral equivalent for the several products was found to be 181, the theoretical value for the acid being 180.

The acid was reacted with phosphorus pentachloride in benzene solution to give the acid chloride, which was warmed with aluminum chloride. The resulting product was mixed with ice and hydrochloric acid, washed, dried, and distilled at 115°–130° C./2–3 mm. There was thus obtained 1-thiachromone. This product was crystallized twice from petroleum ether to give crystals melting at 76°–78° C.

Another portion of ethyl beta-phenylthioacrylate (104 g.) was mixed with 150 ml. of a 1:1 mixture of acetic acid and acetic anhydride. Thereto was slowly added 98 g. of 35% hydrogen peroxide. Upon distillation a fraction was obtained consisting of ethyl beta-phenylsulfonylacrylate, distilling at 190°–210° C./1.8 mm., being a liquid containing 13.7% of sulfur (theory, 13.4%).

In place of ethyl beta,beta-diethoxypropionate or ethyl beta-ethoxyacrylate, there may be reacted with a thiophenol any of the beta,beta-diether propionates or beta-ether acrylates, such as shown above. When about two moles of an alcohol, ROH, have been separated per mole of such propionate or about one mole of alcohol ROH per mole of such acrylate, the reaction is interrupted and the products separated, being esters of phenylthioacrylic acid and alcohols ROH, R being the non-tertiary hydrocarbon residue of a saturated, aliphatic alcohol.

The same type of reaction occurs with alpha-alpha-diether succinates or alpha-ether maleates with formations of alpha-thiomaleates. This reaction is illustrated in the following example.

Example 3

In a reaction vessel equipped with a short column and distilling head there were mixed 192 grams of diethyl alpha,alpha-diethoxysuccinate, 81 grams of thiophenol, and one gram of sodium hydrogen sulfate. The mixture was heated. When the temperature thereof reached 165° C., ethanol was obtained from the column. The reaction temperature was carried to 230° C. The reaction mixture was then heated under reduced pressure. The distillate provided both a liquid and a solid. The solid was identified as diphenyl disulfide, melting at 61° C. The liquid was diethyl alpha-phenylthiomaleate.

The reaction of diethyl ethoxymaleate leads to the same end-product, diethyl alpha-phenylthiomaleate. Use of dibutyl dibutoxysuccinate or dibutyl butoxymaleate leads to dibutyl alpha-phenylthiomaleate, while dimethyl dimethoxysuccinate or methoxymaleate leads to dimethyl phenylthiomaleate.

The substitution of alkylphenyl mercaptans cause the reaction with the ether esters to proceed more readily than with thiophenyl itself. There may thus be used alkylphenyl mercaptans, particularly those with one or more substituents, preferably totaling not more than twelve carbon atoms. The use of these thiophenols is illustrated in the following example.

Example 4

In a reaction flask equipped with distillation column there were mixed 124 grams of para-thiocresol, 190 grams of ethyl beta,beta-diethoxypropionate, and one gram of sodium acid sulfate. The mixture was heated until ethyl alcohol was no longer obtained from the column. The reaction mixture was then subjected to reduced pressure. A fraction was obtained at 137°–138° C./1–2 mm. which consisted of ethyl beta-(p-tolylthio)acrylates, having a refractive index, $n_D^{20}$, of 1.5752. This product was saponified with potassium hydroxide solution and converted then by acidification to beta-(p-tolylthio)acrylate acid, which was obtained as a mixture of the cis and trans forms, melting from 94° to 125° C. The product was partially dissolved in benzene, and the solution separated from the undissolved solid. Crystals were obtained from the filtrate which on recrystallization from benzene melted at 104°–107° C. This is apparently the cis form of the acid. The solid, separated from the benzene solution, was recrystallized from acetone to give crystals melting at 136°–138° C. These represent apparently the trans form of the acid.

Other alkylphenyl mercaptans may be reacted with a beta,beta-diether propionate or beta-ether acrylate to give beta-(alkylphenylthio)acrylates in accordance with the procedure described above. In the same way alkylphenyl mercaptans may be reacted with alpha,alpha-diether succinates or alpha-ether maleates with transetherification to alpha-(alkylphenylthio)-maleates.

We claim:

1. A process which comprises reacting one mole of an ester of the formula

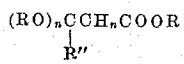

wherein R represents a saturated non-tertiary aliphatic hydrocarbon group of not over eight carbon atoms, R'' represents a member of the class consisting of hydrogen and the —COOR group, and $n$ represents an integer from one to two, with one mole of a monohydric phenyl mercaptan by heating at a temperature between 90° C. and 250° C. in the presence of an alkali metal acid sulfate as catalyst and separating the alcohol ROH therefrom.

2. A process which comprises reacting one mole of the ether ester

wherein R is the saturated aliphatic hydrocarbon residue of not over four carbon atoms of the alcohol ROH, with one mole of a monohydric thiophenol by heating between 90° C. and 250° C. in the presence of an alkali metal acid sulfate as catalyst and separating the alcohol ROH therefrom.

3. A process which comprises reacting one mole of ethyl beta,beta-diethoxypropionate with one mole of a monohydric thiophenol by heating between 90° C. and 250° C. in the presence of an alkali metal acid sulfate as catalyst and separating ethyl alcohol.

4. A process which comprises reacting one mole of ethyl beta-ethoxyacrylate with one mole of a monohydric thiophenol by heating between 90° C. and 250° C. in the presence of an alkali metal acid sulfate as catalyst and separating ethyl alcohol.

5. The process of claim 3 wherein the thiophenol is phenyl mercaptan.

6. The process of claim 3 wherein the thiophenol is thiocresol.

7. The process of claim 4 wherein the thiophenol is phenyl mercaptan.

WILLARD J. CROXALL.
LOUIS R. FREIMILLER.

REFERENCES CITED

The following references are of record in the file of this patent:

UNITED STATES PATENTS

| Number | Name | Date |
| --- | --- | --- |
| 2,199,799 | Jacobson | May 7, 1940 |
| 2,305,663 | Beer et al. | Dec. 22, 1942 |
| 2,341,663 | Schulz | Feb. 15, 1944 |

FOREIGN PATENTS

| Number | Country | Date |
| --- | --- | --- |
| 845,793 | France | Sept. 1, 1939 |